United States Patent
Coulbourn, Jr.

(10) Patent No.: US 7,086,435 B1
(45) Date of Patent: Aug. 8, 2006

(54) TREE HARVESTING APPARATUS AND METHOD WHICH ENABLE A CUT TOP OR OTHER CUT PORTION OF A TREE TO BE WEIGHED BEFORE BEING DROPPED OR LOWERED TO THE GROUND

(76) Inventor: Edwin T. Coulbourn, Jr., 112 Sowdside La., Manteo, NC (US) 27954

( * ) Notice: Subject to any disclaimer, the term of this patent is extended or adjusted under 35 U.S.C. 154(b) by 0 days.

(21) Appl. No.: 11/194,012

(22) Filed: Jul. 29, 2005

(51) Int. Cl.
*A01G 23/08* (2006.01)

(52) U.S. Cl. .................. 144/338; 144/343; 144/4.1; 144/34.1; 144/24.13; 83/77

(58) Field of Classification Search ............... 144/335, 144/338, 343, 24.13, 4.1, 34.1, 2.1, 34.5; 83/77
See application file for complete search history.

(56) References Cited

U.S. PATENT DOCUMENTS

| | | | |
|---|---|---|---|
| 3,294,131 A | 12/1966 | Larson | |
| 3,461,928 A | 8/1969 | Siiro | |
| 3,536,113 A | 10/1970 | Sutherland | |
| 3,563,288 A * | 2/1971 | Brownell | 144/338 |
| 3,604,479 A * | 9/1971 | Jordan | 144/34.1 |
| 3,990,584 A | 11/1976 | Strawson et al. | |
| 3,993,166 A | 11/1976 | Senour | |
| 4,269,241 A | 5/1981 | Hickman | |
| 4,456,093 A | 6/1984 | Finley et al. | |
| 4,746,024 A | 5/1988 | Hensler | |
| 5,377,730 A * | 1/1995 | Hamilton | 144/4.1 |
| 5,429,163 A * | 7/1995 | Frenkel et al. | 144/364 |
| 6,123,124 A | 9/2000 | Naud | |
| 6,408,906 B1 * | 6/2002 | Moon et al. | 144/24.13 |
| 2002/0017336 A1 * | 2/2002 | Gass et al. | 144/2.1 |
| 2004/0250908 A1 * | 12/2004 | Hicks | 144/335 |

OTHER PUBLICATIONS

Trade Literature of Manitou North America related to MRT 2150, Continuous Rotation Telescopic Handler, 2003, 2 pgs.

* cited by examiner

*Primary Examiner*—Bena Miller

(57) ABSTRACT

A tree harvesting apparatus and method is particularly adapted for use in crowded housing and industrial areas where there is concern for relatively heavy cut tree portions causing damage when allowed to free fall to the ground. The tree harvesting apparatus and method enables a cut portion of a tree such as a tree top to be weighed after being cut but before it is lowered or allowed to free fall to the ground dependent on its weight. A camera mounted on the harvesting apparatus enables the cutting and weighing operation to be observed by an operator on the ground. The tree harvesting apparatus mounts on the outer end of a boom which in turn mounts on a turntable which can rotate 360°, thus making the apparatus and method useful for harvesting a plurality of trees from one location of the apparatus.

10 Claims, 7 Drawing Sheets

MOVE TREE TOP CUTTING APPARATUS HAVING UPPER AND LOWER CLAMPING APPARATUS AND CUTTING APPARATUS INTO PLACE AT DESIRED LOCATION AND HEIGHT

ACTIVATE UPPPER AND LOWER CLAMPING APPARATUS SO TREE TRUNK IS FIRMLY HELD BY THE UPPER AND LOWER CLAMPING APPARATUS

ACTIVATE TREE TOP CUTTING APPARATUS SO CUT IS MADE THROUGH THE TREE TRUNK IN AREA BETWEEN THE UPPER AND LOWER CLAMPING APPARATUS

ONCE CUTTING OPERTION IS COMPLETE, RELEASE THE LOWER CLAMPING APPARATUS SUCH THAT IT ONLY MAINTAINS A SLIDING ENGAGEMENT

ONCE LOWER CLAMPING APPARATUS IS RELEASED, ACTIVATE THE BOOM SO THAT THE UPPER CLAMPING APPARATUS RAISES THE SEVERED TREE TOP A SUFFICIENT DISTANCE TO PREVENT THE SEVERED TREE TOP FROM RESTING ON THE TREE TRUNK

WEIGH THE SEVERED TREE TOP WHILE IT IS HELD BY THE UPPER CLAMPING APPARATUS AND DISPLAY WEIGHT TO OPERATOR

IF MEASURED WEIGHT EXCEEDS THE OPERABLE SAFE LOAD LIMIT OF THE BOOM, ACTIVATE OVERLOAD SIGNAL, CLOSE LOWER CLAMPING APPARATUS, OPEN UPPER CLAMPING APPARATUS, ACTIVATE TIPPING MECHANISM, AND ALLOW SEVERED TREE TOP TO FREEFALL TO THE GROUND

IF MEASURED WEIGHT OF SEVERED TREE TOP WEIGHT IS WITHIN SAFE OPERABLE LOAD LIMIT OF THE BOOM, OPEN THE LOWER CLAMPING APPARATUS AND LOWER THE SEVERED TREE TOP TO THE GROUND WHILE BEING HELD BY UPPER CLAMP ONLY

FIGURE 7

TREE HARVESTING APPARATUS AND METHOD WHICH ENABLE A CUT TOP OR OTHER CUT PORTION OF A TREE TO BE WEIGHED BEFORE BEING DROPPED OR LOWERED TO THE GROUND

FIELD OF INVENTION

The invention relates to a tree harvesting apparatus and method which enables the top or other upper portion of a tree to be weighed after it has been cut, but before, dependant on its weight, it has been lowered or allowed to free fall to the ground.

BACKGROUND OF THE INVENTION

U.S. Pat. Nos. 3,294,131; 3,461,928; 3,536,113; 4,269,241; 5,377,730; 6,123,124; and 6,408,906, the teachings of which are incorporated herein by reference, illustrate tree harvesting, cutting and gripping apparatus mounted on an adjustable boom and used for gripping the tree above a line of cut, cutting the tree along the line of cut and then dropping or moving the cut top or other cut portion to the ground.

Problems arise when the tree being harvested is in a suburban area and is close to a fence, house, shelter or the like, any of which might be struck and damaged when the cut tree top or other cut portion of the tree is believed to be unusually heavy and is released and allowed to free fall to the ground and risk damaging structures in its path. Therefore, in some instances, the cut portion is lowered to the ground while still remaining gripped. Heretofore, there has been no way for measuring the actual weight of a cut tree top, a tree length, or block prior to its being dropped or lowered to the ground. Excessive handling time thus becomes involved when the boom mounted cutting and gripping apparatus is used to lower a cut top, limb, short block, or other cut portion of a tree to the ground, even though the cut top, limb or block might otherwise be within a prescribed safe weight limit. Risks are also taken when the actual weight of a cut top or other cut portion of a tree is so heavy as to overload the boom and cause it to tip over.

One known first practice for harvesting a tree is to cut the tree at its base and allow it to fall. An alternative second practice for harvesting a tree involves an operator being lifted by a so called "Bucket Truck" to a position near the top of a tree and harvesting the tree by trimming limbs and cutting short blocks which are lowered or allowed to free fall to the ground. A rope tied to a tree top, a limb or a short block and pulled by hand or tractor is sometimes used in this alternative second practice to avoid damage to a house, a shed, a power line or other structure in the path of the tree top, limb or short block being lowered. Use of a crane and a climber with a chain saw has been a third harvesting practice for harvesting trees by trimming limbs and cutting short blocks.

Prior to the present invention, the tree service industry has thus had to rely primarily on time consuming and sometimes hazardous tree harvesting apparatus and methods that depend upon the tree being either cut at its base and allowed to fall with risk of damage to anything in its path or having the tree top, limbs and short blocks individually cut from the tree and either lowered or allowed to free fall to the ground. In none of the prior art practices however, has the operator been able to measure the actual weight of a tree top, limb or short block after it has been cut but before it has been dropped or lowered to the ground. Overloading of the tree harvesting apparatus may and can occur with prior art practices.

While it has been known to provide an apparatus for monitoring and measuring the weight of a fixed load on a boom or on a forklift, such as described in U.S. Pat. Nos. 3,990,584; 3,993,166; 4,456,093; and 4,746,024, the teachings of which are also incorporated herein by reference, it has not been known, so far as applicant is aware, to provide an apparatus and method associated with a tree harvesting, cutting and gripping apparatus which enables a cut top or other cut portion of a tree after such portion has been cut to be supported by the outer end of a boom and be weighed before being lowered or allowed to free fall to the ground.

Construction forklift apparatus made by Manitou North America, Inc. of Waco, Tex. (hereafter sometimes referred to as "Manitou") is well known in the trade and provides in its Model MRT 2150, referred to by way of example, a computerized system for measuring and displaying the weight of a load of construction material placed on a forklift mounted at the end of a boom. The turntable on which the boom of the Manitou apparatus is mounted rotates 360°. In the Manitou Model MRT 2150 being used for reference, the forklift itself can be lowered to essentially ground level or be raised to a height of almost 70 feet to reach and pick up or deliver a load of construction material for a multi-story building, for example. The Manitou forklift construction apparatus also has means for measuring and displaying the height at which the forklift is located and inputing this height as a signal to its computer. The Manitou apparatus also has means for measuring and displaying the horizontal distance between the center of the boom turntable and the projected location of the forklift on the horizontal plane passing through the base of the boom. A signal representing this distance is also inputted to the Manitou apparatus computer as one factor in helping determine the likelihood of the Manitou apparatus tipping when the boom is at a particular height and angle and is carrying a particular load. Thus, by appropriate programming and calibration, the Manitou apparatus is able to signal its operator at ground level through what Manitou refers to as a "Load Movement Indicator" whenever the Manitou forklift is being overloaded at the particular height and angle at which the boom is disposed.

So far as is known, no one prior to the present applicant has recognized the significance of incorporating weight measuring, height measuring and distance measuring such as found in the Manitou type forklift to the field of tree harvesting and particularly to the task of harvesting trees in crowded suburban areas. More specifically, no one prior to this applicant has recognized that tree cutting and clamping apparatus can, in place of a forklift, be mounted on a boom such as found in the Manitou apparatus and be equipped and operated in such a way as to enable the weight of a tree top or other cut portion to be measured after it has been cut and after its weight has been placed on and transferred to the end of the boom on which the tree cutting and clamping apparatus is mounted in order to be able to determine how such cut portion can best be safely transferred from its elevated position to the ground.

Thus, the principal object of the invention is to provide a tree harvesting method and apparatus for general application to tree harvesting but particularly adapted for use in a crowded suburban area and, which enables a treetop or other cut portion of a tree being harvested to be gripped and weighed prior to being lowered or allowed to free fall to the ground. Another object is to provide a tree harvesting method and apparatus of the type described which is suitable for use in both a crowded suburban area as well as in a totally forested area for harvesting all of the trees accessible within a 360° swing of a boom on which the apparatus is mounted. Other objects will become apparent as the description proceeds.

SUMMARY OF THE INVENTION

A tree harvesting apparatus and method, according to the invention, is based on providing a set of gripping arms and an associated cutting mechanism for gripping and cutting off the top and other portions of the tree in sequence. The harvesting apparatus is mounted at the outer end of a positionable boom that can be swung 360°. When the harvesting is being undertaken in crowded conditions or there is otherwise concern for handling the weight of the top or other cut portion, the invention apparatus enables the cut portion to be weighed immediately after being cut and the measured weight to be used as a basis for deciding whether to allow the cut portion to free fall or be lowered to the ground. Applicant has thus recognized the advantage of both being able to weigh a cut portion of a single tree during harvesting and of being able to rotate the boom 360° when harvesting and weighing portions of multiple trees in a single area accessible to the boom and to the tree harvesting apparatus mounted on the boom. Numerous cut portions of trees can thus be safely weighed and numerous trees can thus be harvested without having to relocate the vehicle on which the boom is mounted. A camera mounted on the boom near the harvesting apparatus is used to observe the manner in which the cut portion is weighed. In combination with being able to weigh a portion of a tree after being cut the invention also has the advantage through use of the camera which is aimed at the clamping and cutting apparatus of being able to monitor the weighing procedure and detect jams caused by oversized timber, metal debris and the like. Provision is also made for measuring with a computerized system the weight of the cut portion of the tree after taking into consideration and processing the existing Manitou apparatus computer signals representing the height of the tree being cut and the distance between the base of the tree and the base of the boom.

The harvesting apparatus of the invention is typically employed after selected limbs of the tree being harvested have been removed by a delimbing apparatus as known to the art. The delimbing apparatus and tree harvesting apparatus of the invention are preferably interchangeably mounted on the outer end of the boom.

DESCRIPTION OF THE DRAWINGS

FIG. 7 describes the steps of a tree harvesting method for harvesting a single tree according to the invention.

DETAILED DESCRIPTION OF THE INVENTION

Figure 1:
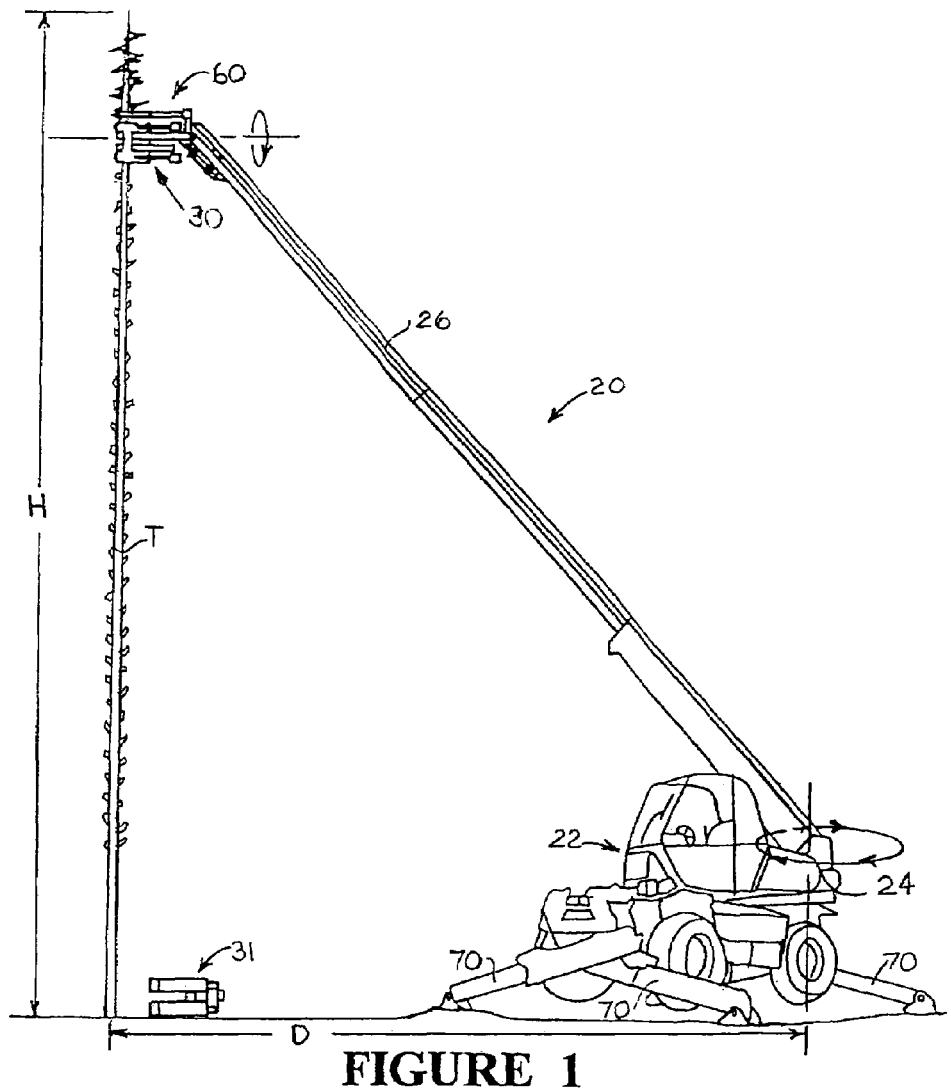
FIG. 1 is a side view illustrating the tree harvesting apparatus of the invention detachably mounted on a positionable boom and clamped to the trunk of a tree preparatory to its top being cut and after having selected of its limbs removed by a delimbing apparatus indicated in FIG. 1 as being detached from the boom.
Figure 2:
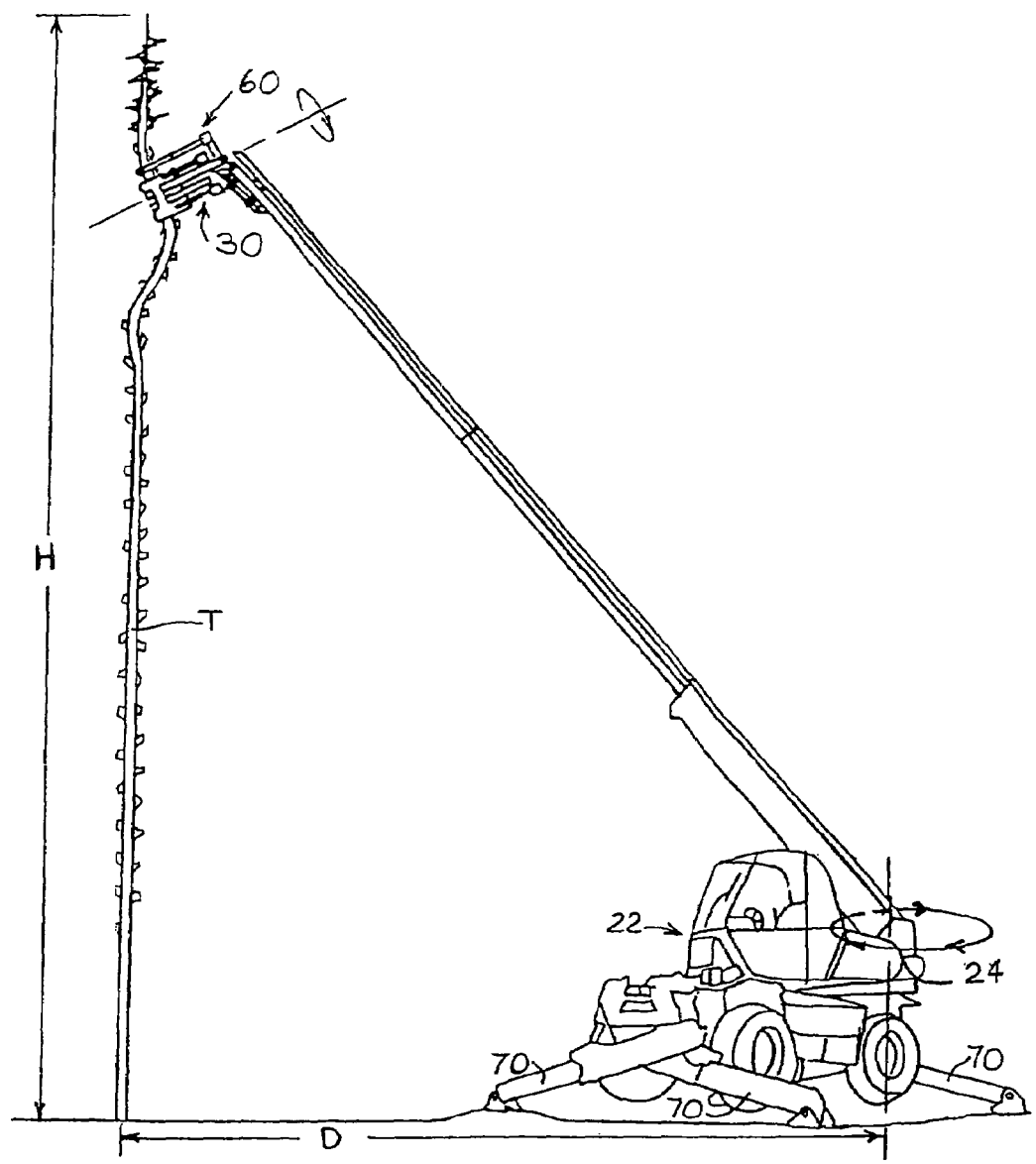
FIG. 2 is a side view similar to that of FIG. 1 but illustrating the tree harvesting apparatus of the invention in an angular position and adapted for being clamped to a somewhat crooked top portion of a tree.
Figure 3:
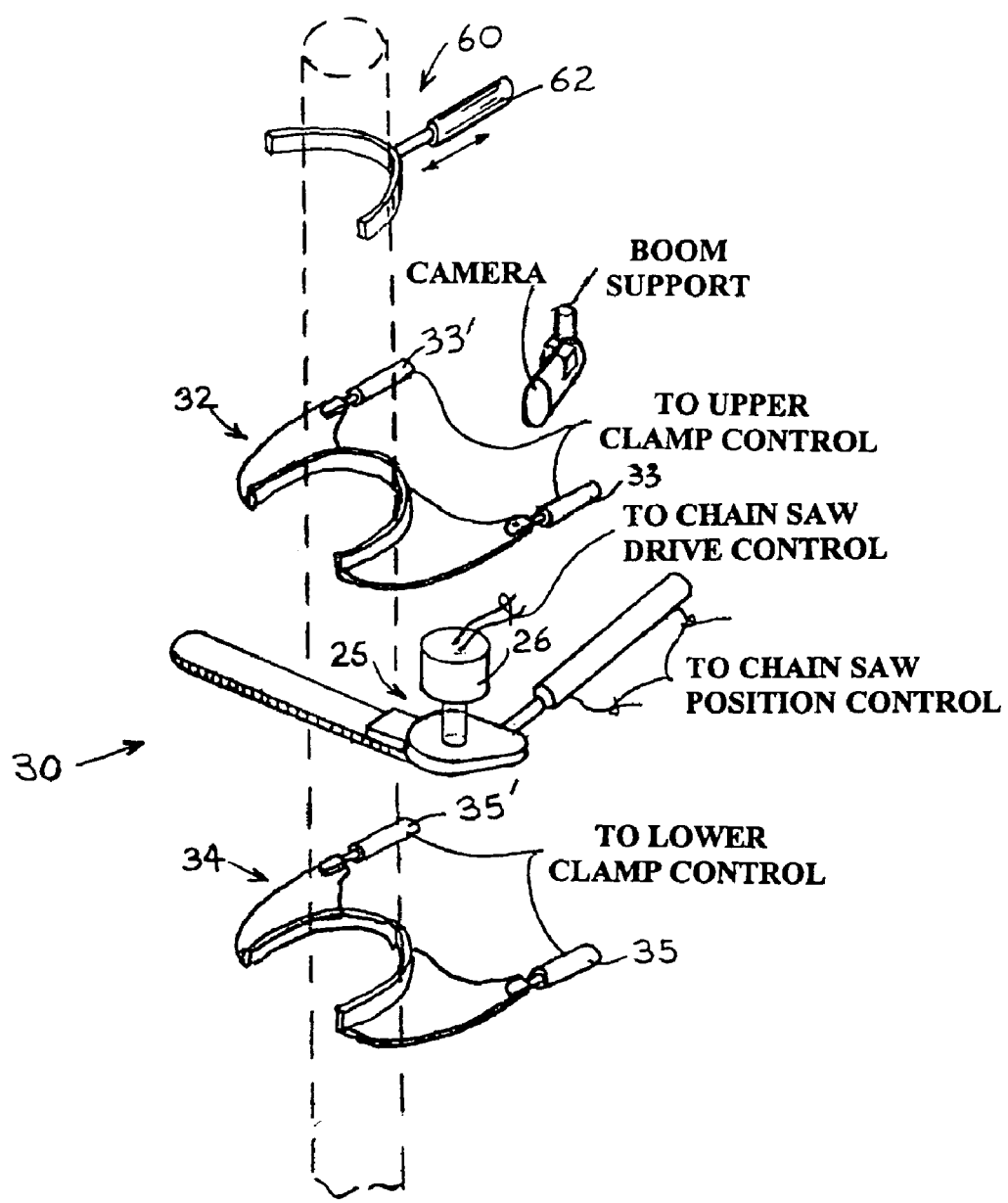
FIG. 3 is a somewhat schematic perspective view of the mounted upper and lower clamps or gripping arms, cutting and weighing apparatus in position for cutting a tree top and thereafter weighing it and while being viewed by a camera at the end of the boom.
Figure 4:
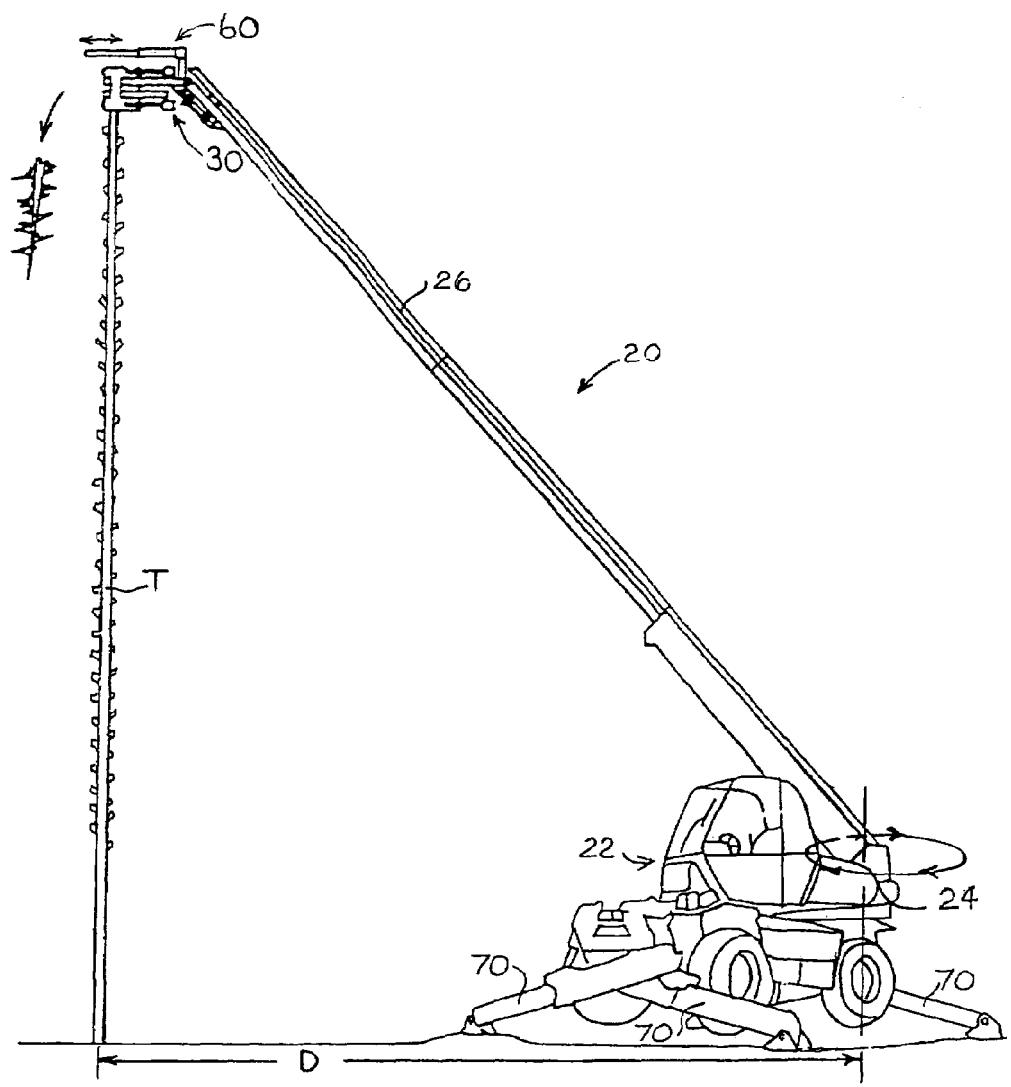
FIG. 4 is a side view like FIG. 1 and showing a cut tree top being dropped by the tipping mechanism after having its weight measured.
Figure 5:
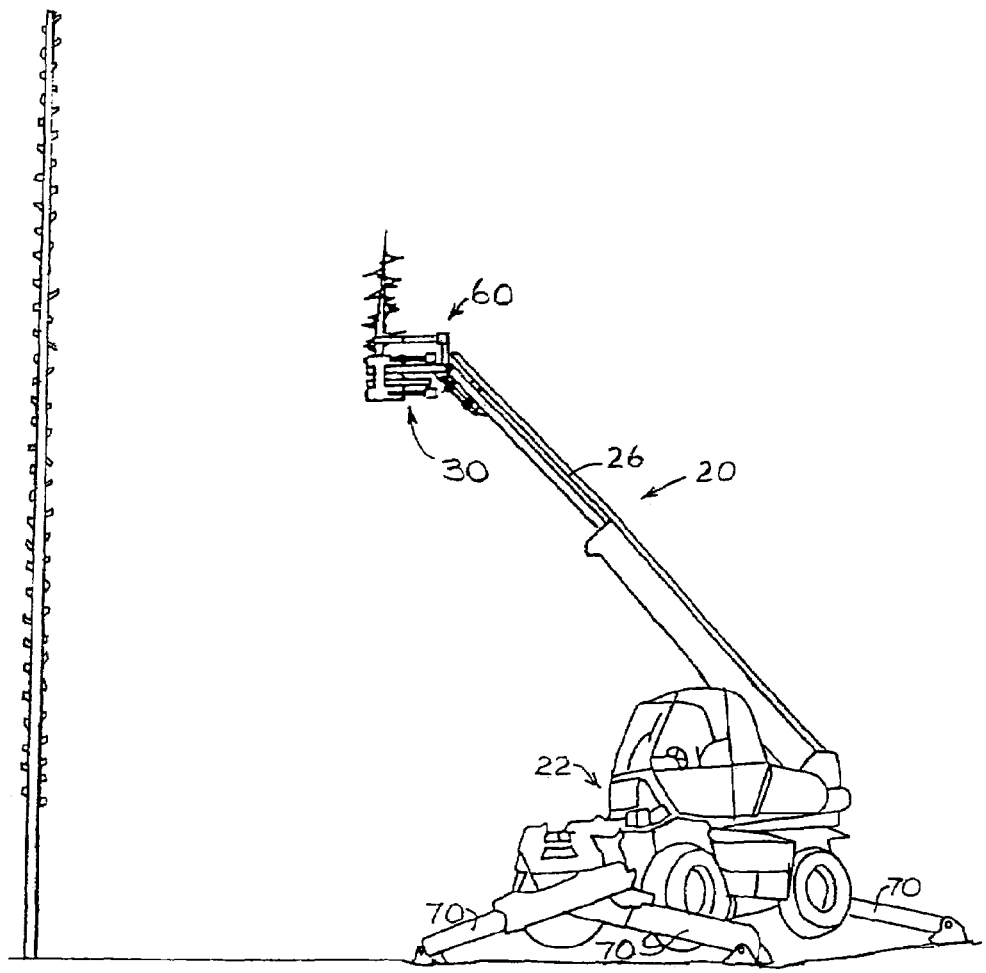
FIG. 5 is a side view showing a cut tree top being lowered after having its weight measured.
Figure 6:
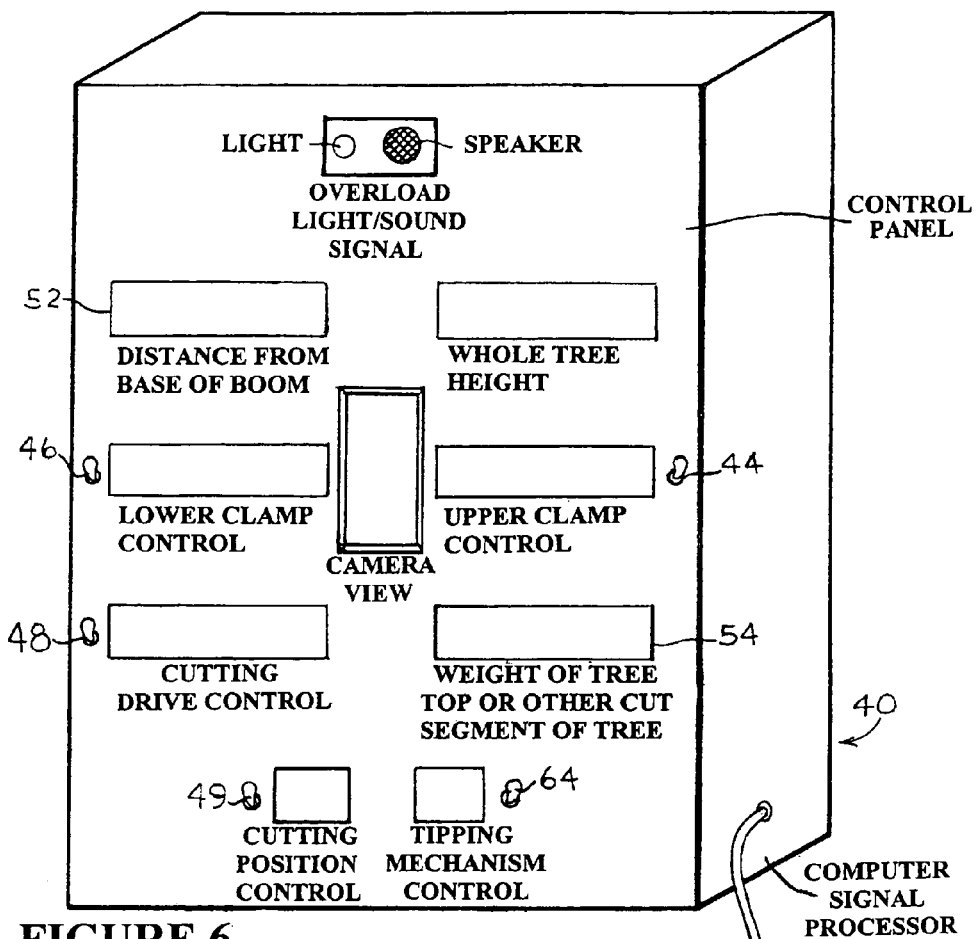
FIG. 6 is a somewhat schematic view of a control panel with which the open-close position of the clamping apparatus can be observed and controlled and the position and drive of the cutting saw can be observed and controlled before, during and after the weighing procedure.

Making reference intitially to FIG. 1 and based on using the referred to Manitou model MRT 2150 as a model, the apparatus 20 of the invention incorporates a vehicle 22 having a 360 degree turntable 24 mounting an extendable boom 26 on the outer end of which is mounted the detachable tree harvesting apparatus 30 of the invention and which many in the trade would refer to as a "head". Turntable 24 is stabilized by means of remotely adjustable outriggers 70 which are used to level the apparatus 20 prior to any use of its boom 26. Apparatus 30 as illustrated in FIG. 3, incorporates an upper tree trunk clamp 32 operated by pistons 33, 33'; and a lower tree trunk clamp 34 operated by pistons 35, 35'. Between the two piston activated clamps 32, 34 there is located a severing device illustrated as a chain saw 25 positioned by piston 39 and driven by hydraulic motor 26. Above the piston activated upper tree clamp 32 there is located a piston activated tipping mechanism 60. Each of the mentioned clamps 32, 34, chain saw 25, and tipping mechanism 60, are remotely and separately opened and closed by an operator sitting in the vehicle 22 and facing a control panel 40 (FIG. 6) which at all times indicates the clamping status of the respective clamps 32, 34, cutting status of the chain saw 25, and tipping status of the tipping mechanism 60. Panel 40 also mounts control levers 44,46 for opening and closing clamps 32, 34, control lever 48 for cutting chain saw 25 on and off, control level 49 for moving chain saw 25 in and out, and control lever 64 for moving tipping mechanism 60 in and out. As previously mentioned a conventional delimbing apparatus 31 (FIG. 1) is used to delimb the tree T before its top is removed. The delimbing apparatus 31 is preferably interchangeably mounted on boom 26 and like the invention apparatus is rotatable about its axis as seen in FIG. 1. The height H (FIG. 1) of the tree is displayed by height display 50, the distance D (FIG. 1) of the tree from the base B of the boom 26 is displayed by distance display 52 and the last measured weight W is displayed by weight display 54. Such weight W is determined by a computer (not shown) located in vehicle 22 and which receives and processes input signals representing such height H and distance D. An overload is indicated both visually and audibly by overload signal 55.

Clamps 32 and 34 are opened and closed by respective pistons 33, 33' and 35, 35' according to the position of control levers 44,46. Chain saw 25 is turned on and off by the position of control lever 48 and is moved in and out by the position of control lever 49. Binding of saw 25 is prevented by evenly pressing upper and lower clamps 32, 34 against the tree being cut. Tipping mechanism 60 is moved in and out by piston 62 according to the position of control lever 64.

The position of boom 26 is detected by suitable position sensors and transferred as signals for conversion to display of height hand distance D.

Weight of the cut portion of the tree is measured by means of a suitable weight sensitive device such as a strain gauge mounted on upper clamp 32 and is displayed on panel display 54 whereby a signal is developed at ground level indicative of the weight of the cut portion of the tree and is displayed in a form which can be observed by the operator of the apparatus.

Harvesting of a tree according to the invention is typically preceded by the step of leveling the vehicle 22 followed by the step of delimbing the tree T. The steps of leveling and delimbing are followed by the steps of the method of the invention described as follows:

Step 1. Move tree top cutting apparatus having upper and lower clamping apparatus and cutting apparatus into place at desired location and height.

Step 2. Activate upper and lower clamping apparatus so tree trunk is firmly held by the upper and lower clamping apparatus.

Step 3. Activate tree top cutting apparatus so cut is made through the tree trunk in area between the upper and lower clamping apparatus.

Step 4. Once cutting operation is complete, release the lower clamping apparatus such that it only maintains a sliding engagement.

Step 5. Once lower clamping apparatus is released, activate the boom so that the upper clamping apparatus raises the severed tree top a distance sufficient to prevent the severed tree top from resting on the tree trunk.

Step 6. Weighing the severed tree top while it is held by the upper clamping apparatus and display weight to operator.

Step 7. If measured weight exceeds the operable safe load limit of the boom, alarm sounds, lower clamping apparatus is tightened and cut or other cut portion is pushed out of upper clamps by tipping mechanism and allowed to freefall to the ground.

Step 8. If measured weight of severed tree top weight is within safe operable load limit of the boom, open the lower clamping apparatus and lower the severed tree top to the ground while being held by upper clamp only.

Figure 8:
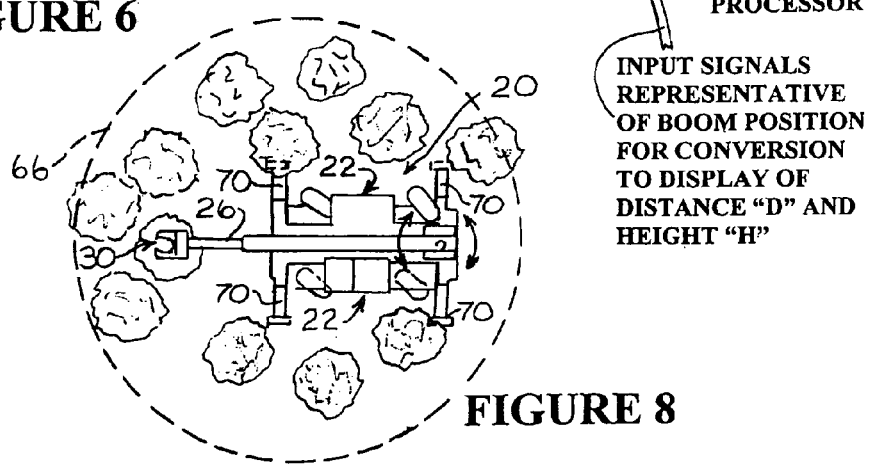
FIG. 8 illustrates how the boom supported tree harvesting apparatus of the invention is used for harvesting a plurality of trees in a single area accessible to the 360° turn of the boom.

A typical method of using the apparatus of the invention in a forested area (FIG. 8) having a plurality of trees to be harvested would be as follows. The apparatus 20 is first located at the center of a relatively large area (FIG. 8) 66 of trees which are intended to be harvested and which are within the reach of the boom 26. Outriggers 70 are extended to provide additional stability. A suitable delimbing apparatus, schematically shown in FIG. 1 as apparatus 31, is used to delimb the trees to be harvested after which the clamping cutting apparatus 30 of the invention is used on each of the selected trees in sequence but without concern for measuring the weight of each cut portion of each tree. The result of this method is that a substantially large number of trees can be harvested from a single location of the invention apparatus 20 of the invention.

The apparatus and method of the invention can thus be seen to be both versatile and adaptable to those situations in which weighing is required and necessary because of safety concerns as well as those situations in which the weight of the cut portion of the tree is of little or no concern.

The invention claimed is:

1. A tree harvesting apparatus comprising:
   (a) an adjustably positionable and extendable boom having an outer end suited for mounting a tree harvesting apparatus having gripping and cutting means;
   (b) gripping means mounted on said boom's outer end as part of said apparatus and arranged for gripping an upper uncut portion of a standing tree at at least one location above a selected intended line of cut extending through the width of the tree, said gripping means being remotely operable at ground level;
   (c) cutting means mounted on said boom's outer end as part of said apparatus, located below said gripping means and being adapted for cutting said tree at said selected line of cut to produce a cut portion thereabove, said cutting means being remotely operable at ground level;
   (d) means for operating said gripping means in a manner which enables the weight of said cut portion to be placed on said outer end of said boom; and
   (e) weighing means in operative association with said apparatus and said boom's outer end proximate said gripping means for developing a signal at ground level indicative of the weight of the said cut portion and converting said signal to a form suited to alerting the operator of said apparatus whenever said weight exceeds some predetermined safe level.

2. A tree harvesting apparatus as claimed in claim 1 wherein said gripping means comprises a pair of independently positionable gripping means, one of which is located above and one of which is located below said selected line of cut.

3. A tree harvesting apparatus as claimed in claim 2 wherein the upper of said gripping means is adapted when the lower of said gripping means are inoperative to momentarily hold said cut portion in position after being cut and while being weighed.

4. A tree harvesting apparatus as claimed in claim 2 wherein the upper of said gripping means is adapted when the lower of said gripping means is inoperative to slightly raise and momentarily hold said cut portion in a slightly raised position after being cut and while being weighed.

5. A tree harvesting apparatus as claimed in claim 1, including a video camera mounted proximate the said outer end of said boom for observing the operation of said gripping and cutting means and creating a comparable image at ground level.

6. A tree harvesting apparatus as claimed in claim 1 including boom mounted pushing means operatively associated with ground level actuating control means and having a portion thereof located above said gripping means and adapted when said pushing means is actuated to push against said cut portion above said line of cut and thereby facilitate the fall of said cut portion to the ground.

7. A method of operating a tree harvesting apparatus of the kind comprising:
   (a) an adjustably positionable and extendable boom having an outer end suited for mounting a tree harvesting apparatus having gripping and cutting means;
   (b) gripping means mounted on said boom's outer end as part of said apparatus and arranged for gripping an upper uncut portion of a standing tree at least one location above a selected line of cut extending through the width of the tree, said gripping means being remotely operable at ground level; and
   (c) cutting means mounted on said boom's outer end as part of said apparatus, located below said gripping means and being adapted for cutting said tree at said selected line of cut to produce a cut portion thereabove, said cutting means being remotely operable at ground level;

said method comprising:
(i) utilizing said gripping means for gripping said tree at at least said one location and while so gripped utilizing said cutting means to sever said tree along said line of cut;
(ii) after cutting said tree along said line of cut operating said gripping means in a manner which enables the weight of said cut portion to be placed on the said outer end of said boom; and
(iii) while the weight of said cut portion is placed on the said outer end of said boom weighing said cut portion and displaying its weight in a manner effective when necessary, to warn the operator of said apparatus of an unsafe condition due to the weight so measured.

8. The method of claim 7 including the step based on said weight as measured of using said boom to lower said cut portion to the ground.

9. The method of claim 7 including the step based on said weight as measured of releasing said clamping means and allowing said cut portion to free fall to the ground.

10. The method of claim 9 including the step by use of ground level controllable pushing means of pushing against said cut portion at a location above said gripping means to facilitate said fall to the ground.

* * * * *